June 4, 1963  M. A. HOWE, JR., ETAL  3,091,904
POULTRY PACKAGING APPARATUS
Filed Sept. 19, 1960  4 Sheets-Sheet 1

June 4, 1963 M. A. HOWE, JR., ETAL 3,091,904
POULTRY PACKAGING APPARATUS
Filed Sept. 19, 1960 4 Sheets-Sheet 4

3,091,904
POULTRY PACKAGING APPARATUS
Milton A. Howe, Jr., Bedford, and Robert L. Dreyfus, Arlington, Mass., assignors to W. R. Grace & Co., Cambridge, Mass., a corporation of Connecticut
Filed Sept. 19, 1960, Ser. No. 56,808
6 Claims. (Cl. 53—390)

This invention relates to an apparatus to be used for plumping and packaging poultry. More particularly, the invention relates to an apparatus that will plump fresh, whole, dressed poultry and which will permit such poultry to be wrapped while held in this plumped state.

It is now the accepted practice to plump whole, fresh, dressed poultry prior to packaging. This plumping or squatting operation produces a more attractive compact bird. Poultry so treated are also more suitable objects for packaging or wrapping since they produce more compact packages and require less wrapping material per bird. Fresh killed poultry have somewhat long and angular lines and the legs are rigid and straight and extend well beyond the end of the body. Such a bird is difficult to package and the resulting package is more subject to puncturing because of the air spaces present in the package.

Plumping is accomplished by loosening the tendons and leg joints and forcing the legs to bend and lie against the sides of the bird so that they do not protrude beyond the end of the body. In some cases pressure is applied simultaneously to the neck and tail sections of the bird compressing the somewhat pliant bird which has the effect of shortening and broadening the body. As a result of these manipulations the bird is given a short plump, broad breasted appearance.

The practice heretofore has been to plump the bird either by hand or by machine and then as a separate operation wrap the bird in a protective wrapping material. This procedure has two disadvantages (1) the plumping and wrapping steps are carried out as separate operations and (2) it is difficult to hand wrap the bird since it is somewhat elastic and will tend to revert to its former shape. This latter aspect is particularly troublesome since the operator has to struggle with the bird to try to keep it in a plumped state with the legs folded and close to the body and at the same time has to handwrap the bird wtih the wrapping material. As a result, the plumping and wrapping operation has been a difficult and inefficient process. A further problem in connection with wrapping of poultry is the accurate positioning of the label on the wrapping material with respect to the body of the bird. Transparent films with printed labels are oftentimes used to package poultry. Such films tend to slip or move when being wrapped about the bird so that it is difficult to wrap the bird so that the label will be located at a predetermined position. It is usually the practice in industry to locate the label over the breast of the bird.

Accordingly, it is an object of the present invention to provide an apparatus which will plump poultry.

It is a further object to provide an apparatus which will both plump poultry and permit the handwrapping of the poultry while held in a plumped condition.

A still further object is to provide an apparatus which will plump and permit the handwrapping of poultry held in the plumped state but will also permit the accurate positioning of the label of the wrapping material on the body of the bird.

Other and further objects, advantages and features of the invention will become apparent to those skilled in the art from the following description taken in conjunction with the accompanying drawings showing a specific embodiment of the present invention and in which.

Figure 1:
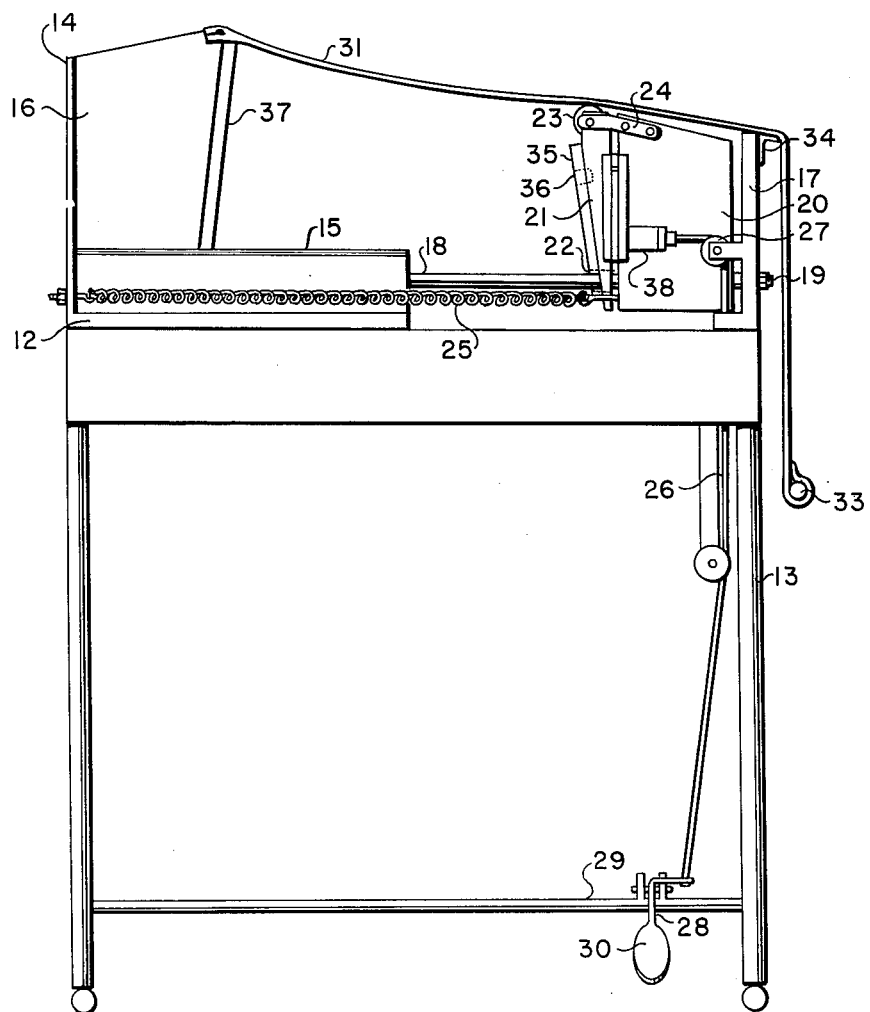
FIGURE 1 is a side elevational view of the apparatus made in accordance with the invention for plumping and handwrapping poultry.
Figure 2:
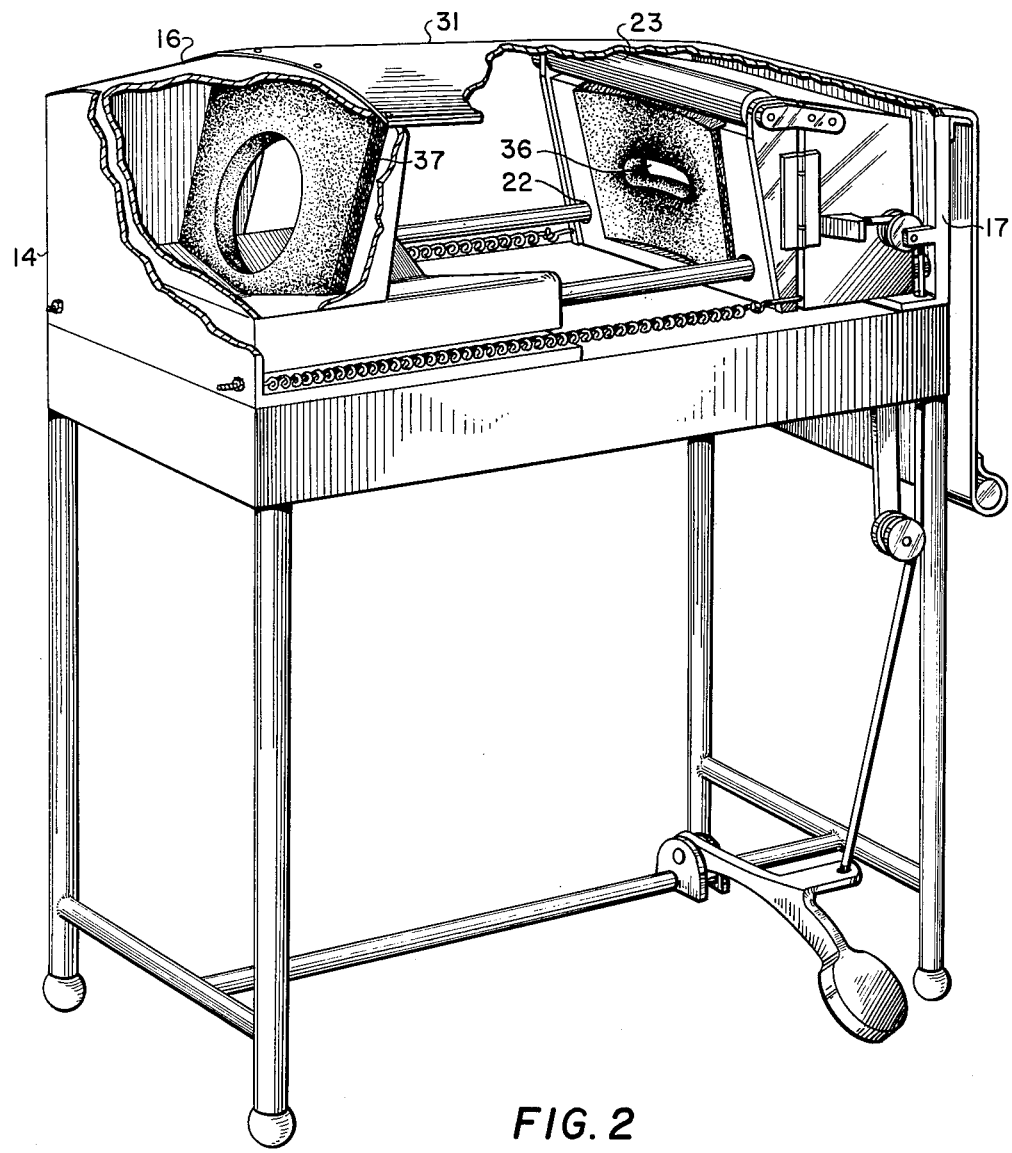
FIGURE 2 is a perspective view of the apparatus of FIGURE 1.

Referring now to FIGURES 1 and 2 of the drawings, numeral 12 refers to a rectangular base mounted on four legs 13. A first right-angled structural member 14 is located at one end of said base. A support 15, the top surface of which may have a concave depression or a shallow V-shaped depression as shown in the drawings, is positioned above the base and against the side of said first right angled structural member. Mounted above the support and against the side of said right-angled structural member is a headpiece 16 which has a concave depression on its face which is lined with foam rubber 37. A second right angle structural member 17 is located at the end of said base opposite said first right angle structural member. A pair of guide rods 18 extend from the support 15 through the second right angle structural member to which they are fastened by means of locking nuts 19. Slidably movable on said guide rods is a block 20 which has dual openings through which the guide rods extend. Attached to said block 20 is an end piece 21 which is also slidably movable on said guide rods through dual openings 22. A foam rubber pad 35 is mounted on the face of said end piece and a section in the center of said pad is cut away creating a concave depression 36. A roller cylinder 23 is positioned just forward of and at the top of the end piece and is rotatably mounted on a pair of braces 24 which are attached to and extend from each side of said block 20.

Located on both sides of said support 15 are coil springs 25 which are secured at one end to the first right angle structural member and at the other end to the block 20. The coil springs function to draw the block 20 and end piece 21 against the support 15. A cable 26 attached at 38 to one side of the block 20 passes over a pulley 27 attached to the second right angle structural member 17, and then down through an opening in the base 12 to a lever 28. The lever, shown in depressed position is pivotally attached at one end to a cross bar 29 which extends between the legs 13 and has a foot plate 30 mounted on the opposite end. Depressing the foot plate causes the block and end piece to be drawn along the guide rods away from the support 15 against the force exerted by the coil springs.

Attached to the upper edge of the head piece 16 is a flexible thin rubber belt 31 which extends over the top of the apparatus and passes over the cylinder 23 and over the upper edge of the second right angle structural member which has attached at the top thereof a bracket 34 which serves to carry the rubber belt away from the side of the apparatus. The rubber belt terminates in a weight 33 which pulls the belt so that it is drawn above and across the apparatus when not being used.

Figure 3:
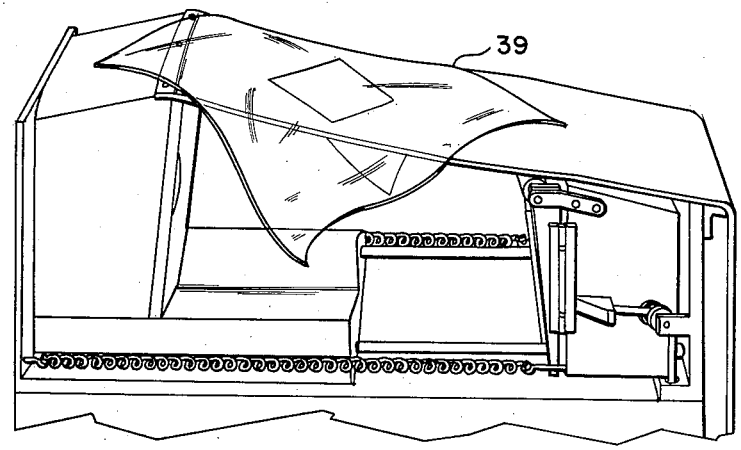
FIGURES 3, 4 and 5 are views of the apparatus in use and illustrating the manner of its operation.
Figure 4:
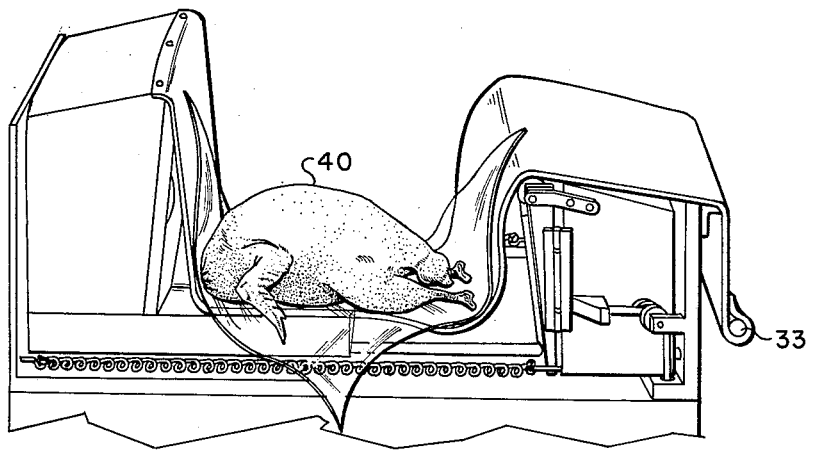
Figure 5:
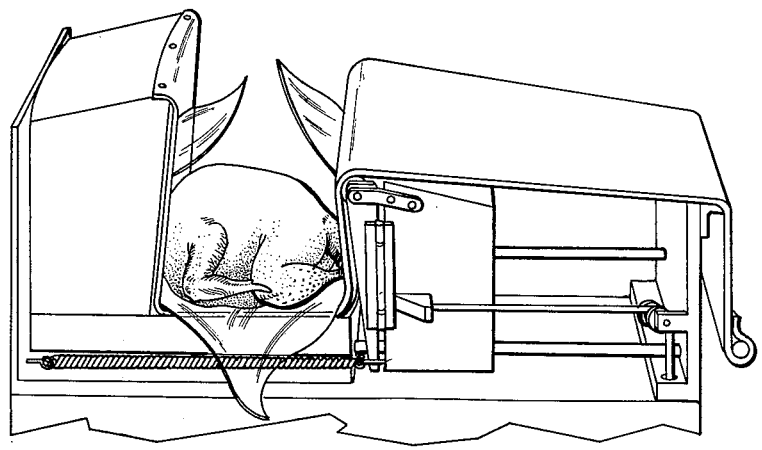

The operation of apparatus is shown in FIGURES 3, 4 and 5 wherein a sheet of wrapping material 39 is placed on the rubber belt so that one of its diagonals lies along the major axis of the belt. The bird 46 is placed breast down on top of the wrapping material and the foot pedal is depressed causing the end piece 21 to be moved away from the support 15. The bird is pushed down and forward with the belt and wrapper remaining beneath the bird until the neck end is arrested by the concave headpiece 16 and the breast is positioned in the V-shaped support 15. As the foot pedal is released the end piece responding to the coil springs moves toward the support and contacts the rearward extending legs of the bird which are caught and held in the concave depression in the end piece. The pressure exerted by the springs is sufficient to overcome the stiffness of the leg joints and tendons and to bend the legs and also compress the body of the bird. While the bird is held in this compressed or plumped state the operator's hands are free to wrap the bird by merely drawing the ends of the wrapping material around and over the back of the bird. The bird is released from the apparatus by depressing the foot pedal.

The ends of the wrapping material may be secured while the bird is in the apparatus or after removal from the apparatus by any of the methods known in the art, such as heat sealing, clipping, gluing, or tying.

Transparent plastic films are particularly desirable for packaging poultry and for use with apparatus of this invention. Examples of such suitable wrapping materials include films of vinylidene chloride-vinyl chloride copolymers such as that sold commercially under the trademark "Cryovac," rubber hydrochloride and polyolefins, such as polyethylene and polypropylene. A particularly suitable film for the purposes of the present invention is a heat shrinkable irradiated biaxially oriented polyethylene such produced according to the teachings of U.S. Patent 2,877,500. By employing a heat shrinking film as a wrapping material it is possible to produce a skin-tight attractive package which is substantially free from air pockets. The apparatus is not limited to use with plastic film but may employ other wrapping materials such as paper, etc.

The flexible rubber belt 31 is a particularly important element of the apparatus. It serves to support the film and prevents the film from slipping because of the friction between the belt and the wrapping film. This insures that the label will remain in a fixed position and since the bird is held in a fixed position by the shaped support it now becomes possible to accurately position the label on the bird. The belt may be composed of materials other than rubber so long as the material used is flexible and will prevent the wrapping material from sliding or slipping.

From the foregoing description it is apparent that the present invention provides a very simple and effective apparatus for producing a neat and attractive poultry package. The apparatus performs the plumping operation converting the narrow angular bird into a plump, rotund bird and also permits the bird to be handwrapped while held in the plumped state. A further benefit of this apparatus is that it provides a simple means for securing the wrapping material which makes it possible to accurately locate the label which is printed on the wrapping material with respect to the bird.

The invention described in detail in the foregoing specification is susceptible to changes and modifications as may occur to persons skilled in the art and is not limited to the precise details of construction as shown and described herein. The terminology used in the specification is used for purposes of description and not of limitation, the scope of the invention being defined in the claims.

We claim:

1. Apparatus for plumping and applying a wrapper to poultry comprising a first holding means adapted to hold one end of the poultry, a second holding means adapted to hold the opposite end of the poultry, a means to reciprocally move said first and second holding means with respect to each other, and a flexible rubber belt attached at one end to said first holding means and yieldingly held under tension at its opposite end.

2. Apparatus for plumping and applying a wrapper to poultry as set forth in claim 1 wherein said means to reciprocally move said first and second holding means with respect to each other comprises a spring means yieldingly urging said second holding means towards said first holding means and means for moving said second holding means away from said first holding means.

3. Apparatus for plumping and applying a wrapper to poultry as set forth in claim 2 wherein said first holding means comprises a horizontal V-shaped support adapted to firmly support the breast of the poultry and an upright concave headpiece adapted to hold the neck portion of said poultry.

4. Apparatus for plumping and applying a wrapper to poultry as set forth in claim 3 wherein said second holding means comprises a movable plate having a depression on its face adapted to hold the legs of said poultry.

5. An apparatus for plumping and applying a wrapper to poultry comprising in combination a horizontal support adapted to firmly support the breast portion of said poultry, an upright concave headpiece attached to one end of said support adapted to hold the neck portion of said poultry, a movable plate having a recessed area on its face adapted to hold the legs of said poultry and movable with respect to said support, a spring means urging said movable plate towards said concave headpiece and said support, means for moving said movable plate in a direction opposite to force of said spring means, and a flexible rubber belt attached to one end to said headpiece extending over said movable plate and yieldingly held at its opposite end.

6. Apparatus for plumping and applying a wrapper to poultry comprising a first holding means adapted to hold one end of the poultry, a second holding means adapted to hold the opposite end of the poultry, means to reciprocally move said first and second holding means with respect to each other, and a flexible belt attached at one end to said first holding means and yieldingly held under tension at its opposite end, said belt having a wrapper supporting surface which frictionally holds said wrapper in fixed position.

References Cited in the file of this patent

UNITED STATES PATENTS

| | | |
|---|---|---|
| 1,829,281 | Henley | Oct. 27, 1931 |
| 1,985,466 | Simmons | Dec. 25, 1934 |
| 1,992,831 | Mienoher | Feb. 26, 1935 |
| 2,174,924 | McCleary | Oct. 3, 1939 |
| 2,500,819 | Hall et al. | Mar. 14, 1950 |
| 2,555,584 | Fairbank | June 5, 1951 |
| 2,750,723 | Fisher | June 19, 1956 |